(12) United States Patent
Im et al.

(10) Patent No.: US 11,603,696 B2
(45) Date of Patent: Mar. 14, 2023

(54) APPARATUS FOR AUTOMATICALLY OPENING AND CLOSING TRUNK LID

(71) Applicants: Hyundai Motor Company, Seoul (KR); Kia Motors Corporation, Seoul (KR); Pyeong Hwa Automotive Co., Ltd., Daegu (KR)

(72) Inventors: Yong-Hyuck Im, Seoul (KR); Doo-Jung Kim, Daegu (KR)

(73) Assignees: Hyundai Motor Company, Seoul (KR); Kia Motors Corporation, Seoul (KR); Pyeong Hwa Automotive Co., Ltd., Daegu (KR)

( * ) Notice: Subject to any disclaimer, the term of this patent is extended or adjusted under 35 U.S.C. 154(b) by 160 days.

(21) Appl. No.: 17/152,347

(22) Filed: Jan. 19, 2021

(65) Prior Publication Data

US 2022/0112759 A1    Apr. 14, 2022

(30) Foreign Application Priority Data

Oct. 8, 2020    (KR) .......................... 10-2020-0129828

(51) Int. Cl.
*E05F 15/63*    (2015.01)
*B62D 25/10*    (2006.01)
(Continued)

(52) U.S. Cl.
CPC ............ *E05F 15/63* (2015.01); *B62D 25/088* (2013.01); *B62D 25/10* (2013.01); *E05F 1/1066* (2013.01);
(Continued)

(58) Field of Classification Search
CPC ...... B62D 25/10; B62D 25/105; B62D 25/12; E05F 1/1066; E05F 1/002; E05F 15/63; E05F 1/10
(Continued)

(56) References Cited

U.S. PATENT DOCUMENTS

| 2018/0086185 A1* | 3/2018 | Kato | B62D 25/12 |
| 2020/0141164 A1* | 5/2020 | Kim | G01S 17/89 |
| 2022/0098908 A1* | 3/2022 | Im | E05F 15/63 |

FOREIGN PATENT DOCUMENTS

| DE | 102006058138 A1 * | 6/2008 | ............ E05F 1/1066 |
| DE | 102017006125 A1 * | 1/2019 | ............ E05D 5/062 |

(Continued)

OTHER PUBLICATIONS

Machine translation KR-101105465-B1.*

*Primary Examiner* — D Glenn Dayoan
*Assistant Examiner* — Kevin P Weldon
(74) *Attorney, Agent, or Firm* — Slater Matsil, LLP (57) ABSTRACT

An apparatus for automatically opening and closing a trunk lid includes an actuator having a first end configured to be coupled to a vehicle body and a second end configured to be coupled to a hinge arm coupled to the trunk lid, a closing trigger link having a first end rotatably coupled to the actuator, an opening trigger link rotatably coupled to the closing trigger link, a spring assembling pin having a first end coupled to the closing trigger link and the opening trigger link, and a spring having a first end coupled to a second end of the spring assembling pin, and a second end configured to be coupled to the vehicle body or a panel configured to be mounted on the vehicle body.

20 Claims, 9 Drawing Sheets

(51) Int. Cl.
*E05F 1/10* (2006.01)
*B62D 25/08* (2006.01)
(52) U.S. Cl.
CPC ..... *E05Y 2201/434* (2013.01); *E05Y 2201/47* (2013.01); *E05Y 2201/624* (2013.01); *E05Y 2201/716* (2013.01); *E05Y 2900/548* (2013.01)
(58) Field of Classification Search
USPC .......................................................... 296/76
See application file for complete search history.

(56) References Cited

FOREIGN PATENT DOCUMENTS

| | | | | |
|---|---|---|---|---|
| KR | 20070025707 | A | * | 3/2007 |
| KR | 101105465 | B1 | * | 1/2012 |
| KR | 101923887 | B1 | | 11/2018 |

* cited by examiner

APPARATUS FOR AUTOMATICALLY OPENING AND CLOSING TRUNK LID

CROSS-REFERENCE TO RELATED APPLICATIONS

This application claims priority to Korean Patent Application No. 10-2020-0129828, filed on Oct. 8, 2020, which application is hereby incorporated herein by reference.

TECHNICAL FIELD

The present disclosure relates to an apparatus for automatically opening and closing a trunk lid for a vehicle.

BACKGROUND

Figure 1:
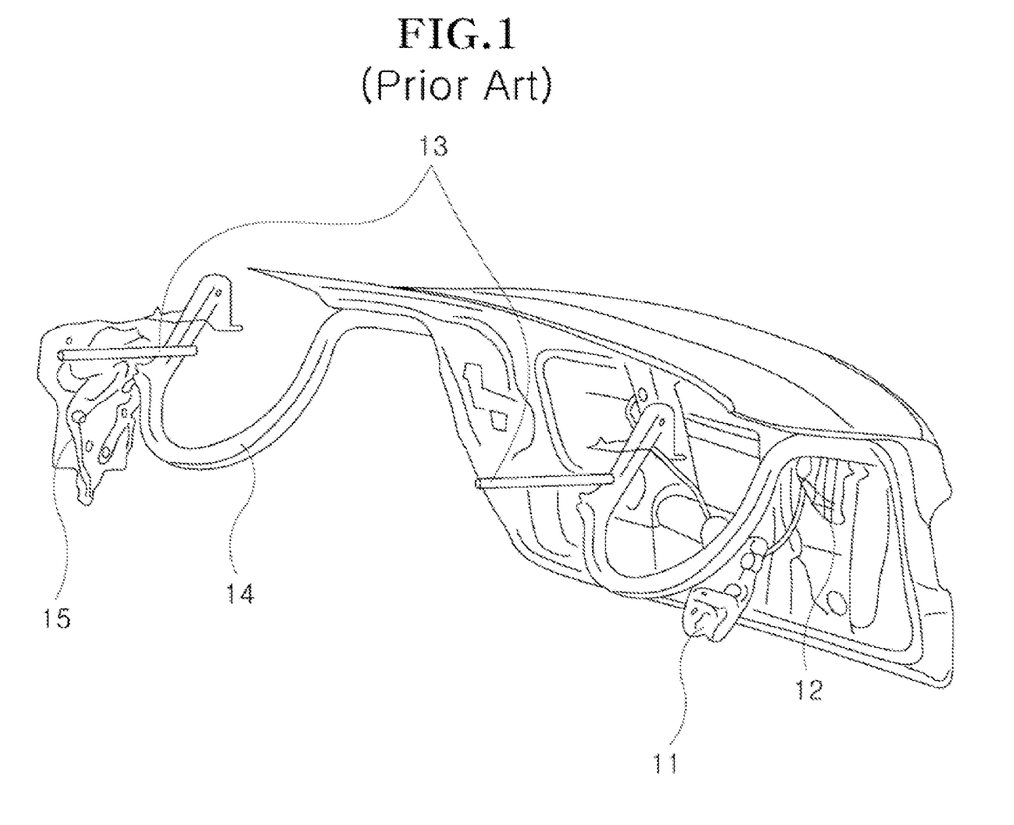
FIG. 1 schematically illustrates a general automatic opening and closing apparatus of a trunk lid.

FIG. 1 schematically illustrates a conventional and general opening and closing apparatus of a trunk lid.

A trunk room of a car is a space at the rear of the vehicle for storing cargo and mounted with a trunk lid to be opened or closed.

The design and form of the trunk lid may vary, but generally, the trunk lid has a panel shape bent to shield the upper side and rear side of the trunk room, and is coupled to a vehicle body by a hinge arm 14 to be opened or closed as the hinge arm is rotated.

The edge end of the trunk lid and the vehicle body are mounted with a striker and a latch 11, respectively, for controlling the opening of the trunk lid when the trunk lid is closed. The latch 11 is connected to a latch actuator 12 by a wire, and when the striker is released from the latch 11, lifters such as a gas lifter 13 and a torsion bar are added to lift the trunk lid.

To improve the user's convenience, a power trunk is an apparatus for opening and closing the trunk lid using the force of a motor, and configured such that the trunk lid is opened or closed using a switch or a remote controller attached to the vehicle body.

As illustrated, the power trunk has one end coupled to the trunk lid and the other end having the gas lifter 13 coupled to the hinge arm 14 coupled to the vehicle body to be rotatable, and as the striker is released from the latch, the gas lifter 13 extends and thus the trunk lid is opened, and the trunk lid is closed by overcoming an elastic force of the gas lifter 13 by an operation of a drive unit 15.

The drive unit 15 is configured by coupling a motor, a control unit, and a gear apparatus.

However, there is a limit in which the power trunk is applied to only a luxury car because of the excessive cost and weight, and the noise due to a large motor is also generated.

The contents described above are to help the understanding of the related art of the present disclosure, and may include what is not previously known to those skilled in the art to which the present disclosure pertains.

SUMMARY

An embodiment of the present disclosure provides an apparatus capable of smoothly and automatically opening and closing a trunk lid without a large motor.

An apparatus for automatically opening and closing a trunk lid according to one embodiment of the present disclosure includes an actuator having one end coupled to a vehicle body and the other end coupled to a hinge arm coupled to a trunk lid, a closing trigger link having one end rotatably coupled to the actuator, an opening trigger link rotatably coupled to the closing trigger link, a spring assembling pin having one end coupled to the closing trigger link and the opening trigger link, and a spring having one end coupled to the other end of the spring assembling pin, and the other end coupled to the vehicle body or a panel mounted on the vehicle body.

Further, the closing trigger link includes a rotating part having one end coupled to the actuator and a closing reaction force part formed to extend from the other end of the rotating part.

Further, the opening trigger link includes an opening reaction force part having one end coupled to the other end of the rotating part and a constraining part formed to extend from the one end of the opening reaction force part.

Here, one end of the spring assembling pin is coupled to the other end of the rotating part and the one end of the opening reaction force part.

Furthermore, protrusion pins are fastened to one end of the rotating part and the edge end of the constraining part, respectively, and the apparatus for automatically opening and closing the trunk lid may further include a link spring having one end coupled to the protrusion pin of the rotating part and the other end coupled to the protrusion pin of the constraining part.

Therefore, the protrusion pin coupled to the constraining part is fastened to penetrate the edge end of the constraining part, and has one end coupled to the link spring, and the other end in contact with the closing trigger link upon the rotating operation of the constraining part.

Meanwhile, when the closing trigger link is rotated counterclockwise, the opening reaction force part applies a pushing force to the vehicle body or the panel mounted on the vehicle body.

Alternatively, when the closing trigger link is rotated clockwise, the closing reaction force part applies a pushing force to the vehicle body or the panel mounted on the vehicle body.

Next, an apparatus for automatically opening and closing a trunk lid according to another embodiment of the present disclosure includes an actuator having one end coupled to a vehicle body and the other end coupled to a hinge arm coupled to a trunk lid, a closing trigger link including a rotating part having one end rotatably coupled to the actuator and a closing reaction force part formed to extend from the other end of the rotating part, and an opening trigger link including an opening reaction force part having one end rotatably coupled to the other end of the rotating part and a constraining part formed to extend from the one end of the opening reaction force part.

Further, when the closing trigger link is rotated counterclockwise, the opening reaction force part applies a pushing force to the vehicle body or a panel mounted on the vehicle body.

Further, when the closing trigger link is rotated clockwise, the closing reaction force part applies the pushing force to the vehicle body or the panel mounted on the vehicle body.

Furthermore, the apparatus for automatically opening and closing the trunk lid may further include a spring assembling pin having one end coupled to the other end of the rotating part and the one end of the opening reaction force part and a spring having one end coupled to the other end of the spring assembling pin, and the other end coupled to the vehicle body or the panel mounted on the vehicle body.

Further, protrusion pins are fastened to one end of the rotating part and the edge end of the constraining part, respectively, and the apparatus for automatically opening and closing the trunk lid may further include a link spring having one end coupled to the protrusion pin of the rotating part and the other end coupled to the protrusion pin of the constraining part.

Further, the protrusion pin coupled to the constraining part is fastened to penetrate the edge end of the constraining part, and has one end coupled to the link spring, and the other end in contact with the rotating part upon the rotating operation of the constraining part.

The apparatus for automatically opening and closing the trunk lid according to embodiments of the present disclosure may reduce the weight of the vehicle and reduce the manufacturing cost using the compact motor.

Therefore, the apparatus for automatically opening and closing the trunk lid according to embodiments of the present disclosure may also be applied to small to medium-sized vehicles, thereby enhancing the customer's convenience.

BRIEF DESCRIPTION OF THE DRAWINGS

FIGS. 4A and 4B illustrate the side shape of one configuration of the apparatus for automatically opening and closing the trunk lid according to embodiments of the present disclosure, in which FIG. 4A illustrates the inside of a part of the configuration.

DETAILED DESCRIPTION OF ILLUSTRATIVE EMBODIMENTS

To fully understand the present disclosure, operational advantages of the present disclosure, and the objects achieved by the practice of the present disclosure, reference should be made to the accompanying drawings illustrating preferred exemplary embodiments of the present disclosure and the contents illustrated in the accompanying drawings.

In describing the preferred exemplary embodiments of the present disclosure, the description of the known technology or repetitive description capable of unnecessarily obscuring the subject matter of the present disclosure will be reduced or omitted.

Figure 2:
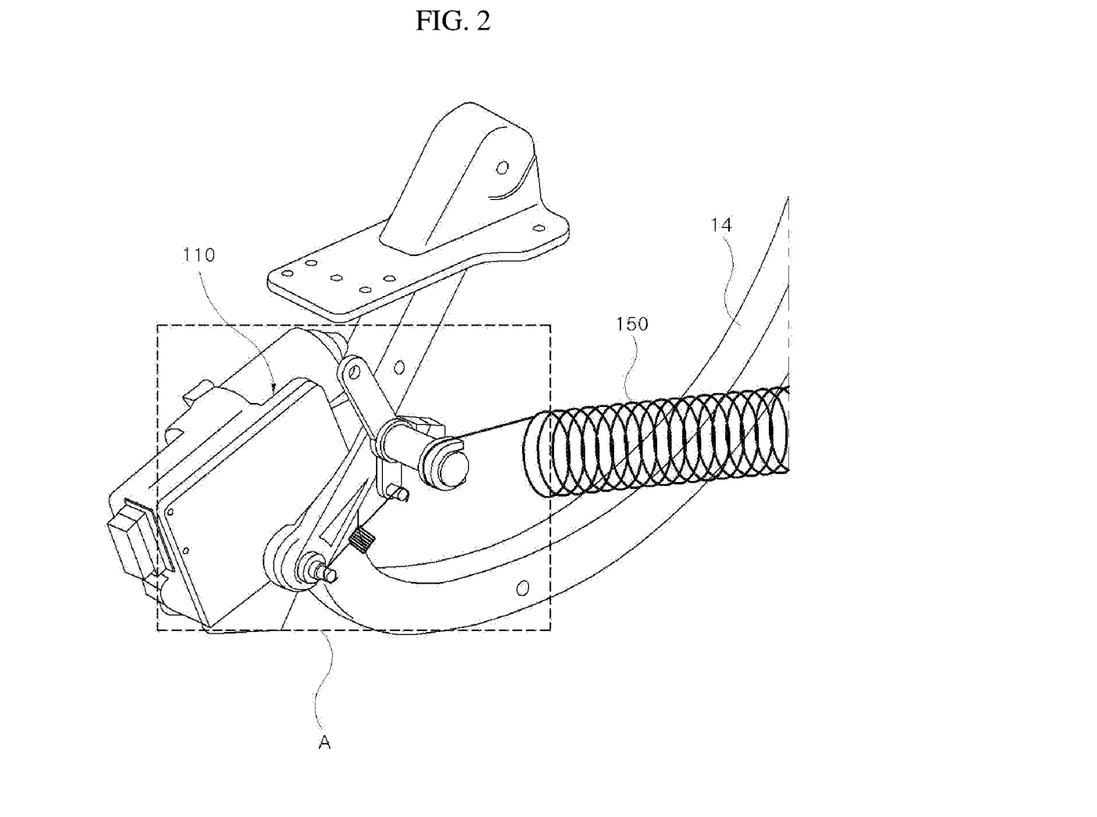
FIG. 2 schematically illustrates an apparatus for automatically opening and closing a trunk lid according to embodiments of the present disclosure.
Figure 3:
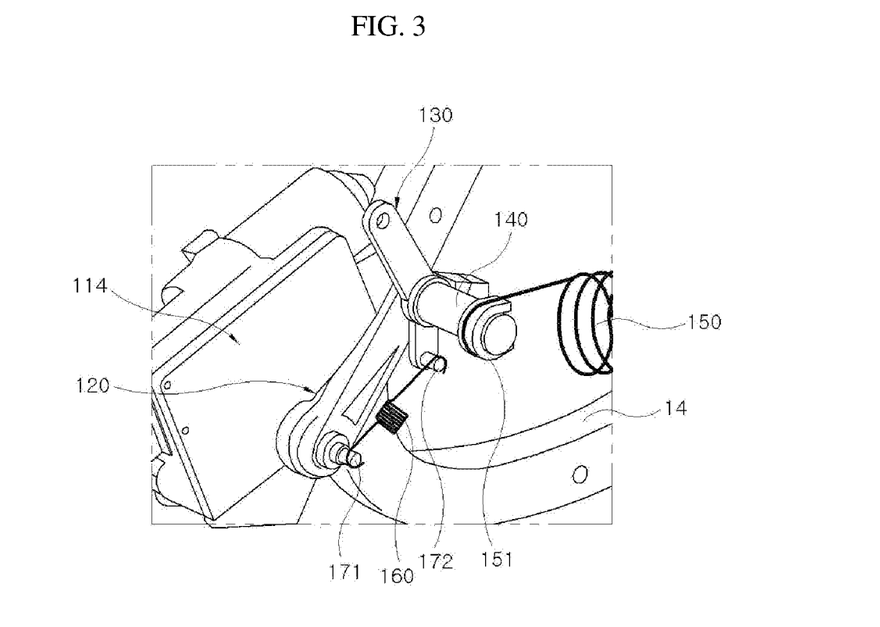
FIG. 3 is an enlarged diagram of a portion A illustrated in FIG. 2.

FIG. 2 schematically illustrates an apparatus for automatically opening and closing a trunk lid according to embodiments of the present disclosure, and FIG. 3 is an enlarged diagram of a portion A illustrated in FIG. 2.

Figure 4A:
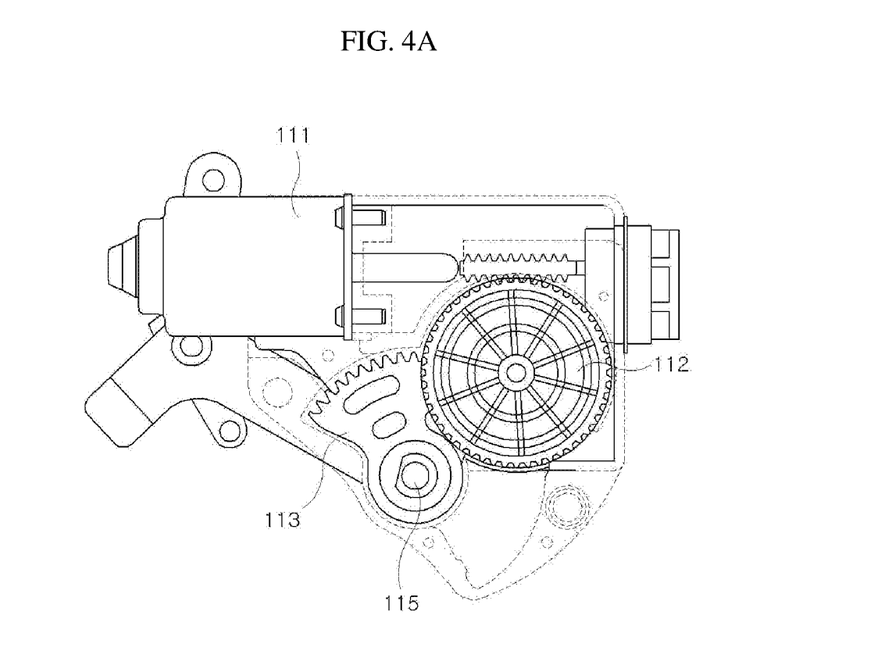
Figure 4B:
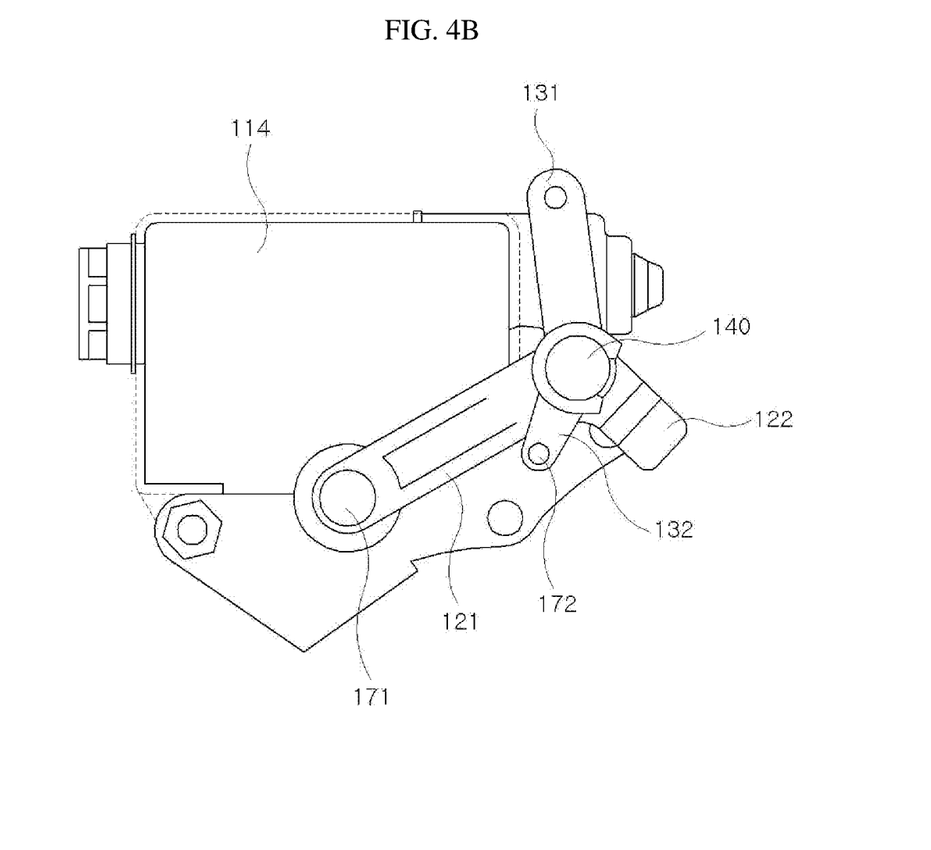
Figure 5:
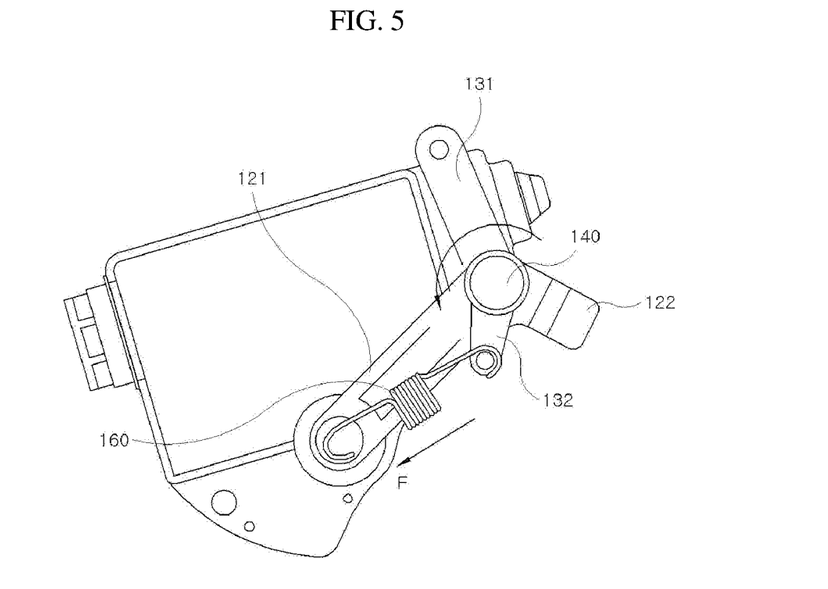
FIG. 5 illustrates the operating relationship of the apparatus for automatically opening and closing the trunk lid according to embodiments of the present disclosure.

Further, FIGS. 4A and 4B illustrate the side shape of one configuration of the apparatus for automatically opening and closing the trunk lid according to embodiments of the present disclosure, in which FIG. 4A illustrates the inside of a part of the configuration, and FIG. 5 illustrates the operating relationship of the apparatus for automatically opening and closing the trunk lid according to embodiments of the present disclosure.

Hereinafter, an apparatus for automatically opening and closing a trunk lid according to an exemplary embodiment of the present disclosure will be described with reference to FIGS. 2 to 5.

The present disclosure relates to an apparatus for automatically opening and closing a trunk lid, and is an apparatus capable of automatically opening and closing a trunk lid by a compact actuator without applying the drive unit like the related art.

That is, as an actuator 110 is operated, a closing trigger link 120 and an opening trigger link 130 are rotated in conjunction with each other such that the trunk lid is operated to be closed or opened.

The actuator 110 has a motor housing 114 coupled to the hinge arm 14, and a motor 111, a first gear 112, and a second gear 113 embedded in the motor housing 114.

The motor housing 114 is coupled adjacent to a vehicle body side of the hinge arm 14, the first gear 112 and the second gear 113 are engaged with each other to be operated by an operation of the motor 111, and the closing trigger link 120 coupled to a motor rotary shaft 115, which is the rotary shaft of the second gear 113, is rotated.

The closing trigger link 120 has one end rotatably coupled to the motor rotary shaft 115, and is composed of a rotating part 121 and a closing reaction force part 122.

That is, the rotating part 121 has one end rotatably coupled to the motor rotary shaft 115, and thus the rotating part 121 is rotated by the operation of the actuator 110, and the closing reaction force part 122 bent at and extending from the other end of the rotating part 121 is formed.

Further, one end of the opening reaction force part 131 of the opening trigger link 130 is rotatably coupled to the other end of the rotating part 121 of the closing trigger link 120, and the other end of the opening reaction force part 131 is formed to extend toward the vehicle body. Further, a constraining part 132 bent at and extending from one end of the opening reaction force part 131 is formed.

Therefore, the other end of the rotating part 121 of the closing trigger link 120 and one end of the opening reaction force part 131 of the opening trigger link 130 are linked, such that the opening trigger link 130 is also rotated together when the closing trigger link 120 is rotated.

Furthermore, a spring assembling pin 140 is coupled to both the other end of the rotating part 121 and one end of the opening reaction force part 131, such that the opening reaction force part 131 is rotated around the spring assembling pin 140.

Further, one end of the spring 150 is coupled to the spring assembling pin 140 via a bush 151, and the other end of the spring 150 is coupled to the trunk lid, thereby generating an elastic force as the trunk lid is opened and closed.

As described above, the apparatus for automatically opening and closing the trunk lid according to embodiments of the present disclosure has a trigger mechanism structure capable of implementing the robust opening and closing performance with a technology of automatically opening and closing the trunk lid with the compact actuator by changing the layout of the spring, in which the trunk is opened by a spring force when the trunk lid is opened, and closed by its own force by its own weight of the trunk when the trunk lid is closed.

That is, assuming that the counterclockwise moment according to the spring is set as Ms and the clockwise moment according to the weight of the trunk is set as Mt, Ms>Mt occurs when the trunk is opened, such that the trunk is opened by the spring force, and Ms<Mt occurs when the trunk is closed, such that the trunk is closed by its own force by its own weight of the trunk.

Further, to transfer more smooth operation and the force upon the opening and closing operation of the trunk, an additional panel is formed on the vehicle body, and the closing trigger link and the opening trigger link push the panel, thereby generating an additional rotating force by a reaction force.

Meanwhile, a protrusion pin 171 is fastened to one end of the rotating part 121 of the closing trigger link 120, and a protrusion pin 172 is also fastened to the edge end of the constraining part 132 of the opening trigger link 130.

Therefore, both ends of a link spring 160 are coupled to the protrusion pin 171 coupled to the rotating part 121 and the protrusion pin 172 coupled to the constraining part 132, and as illustrated in FIG. 5, when the opening trigger link 130 is rotated counterclockwise around the spring assembling pin 140, a restoring force by the link spring 160 is applied to the opening trigger link 130.

Further, the restoring force serves to prevent the clockwise rotation of the opening trigger link 130. That is, the protrusion pin 172 coupled to the constraining part 132 is coupled to penetrate the edge end of the constraining part 132, such that the constraining part 132 (the protrusion pin 172) may have one end coupled to the link spring 160, and the other end in contact with the closing trigger link 120 upon clockwise rotation, thereby preventing the clockwise rotation.

Next, FIGS. 6 to 13 sequentially illustrate the operation states of the apparatus for automatically opening and closing the trunk lid according to embodiments of the present disclosure. The operation states of the apparatus for automatically opening and closing the trunk lid according to embodiments of the present disclosure will be described with reference to FIGS. 6 to 13.

Figure 6:
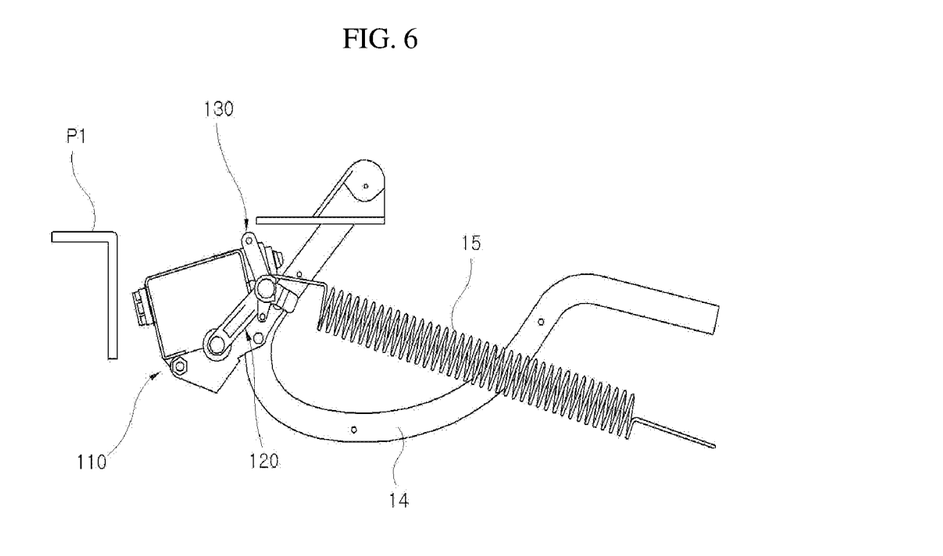
FIGS. 6 to 13 sequentially illustrate the operation states of the apparatus for automatically opening and closing the trunk lid according to embodiments of the present disclosure.
Figure 7:
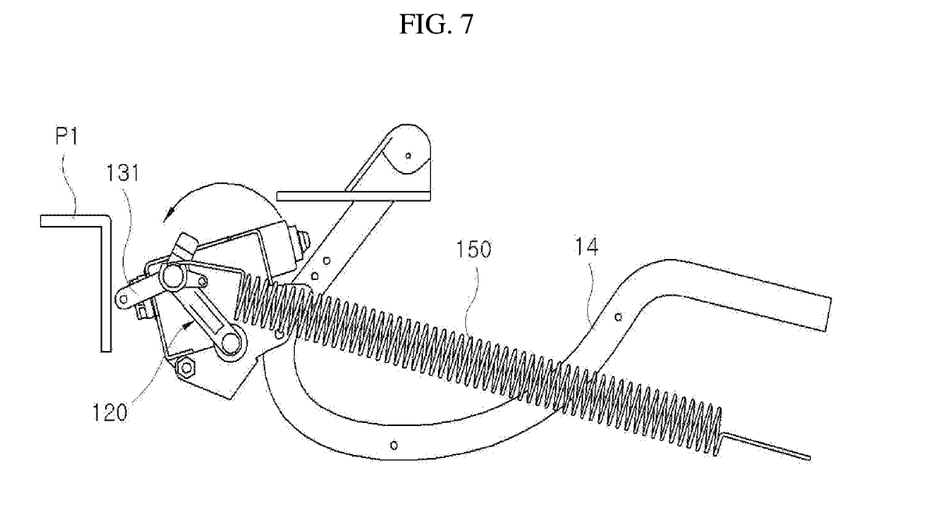

First, FIG. 6 illustrates the closed state of the state which is Mt>Ms. In this state, the actuator is operated by an opening instruction, such that when the motor rotary shaft 115 is rotated counterclockwise, as illustrated in FIG. 7, the closing trigger link 120 coupled to the motor rotary shaft 115 is rotated, and the opening trigger link 130 coupled to the closing trigger link 120 is rotated together. At this time, the state of Mt<Ms occurs.

Figure 8:
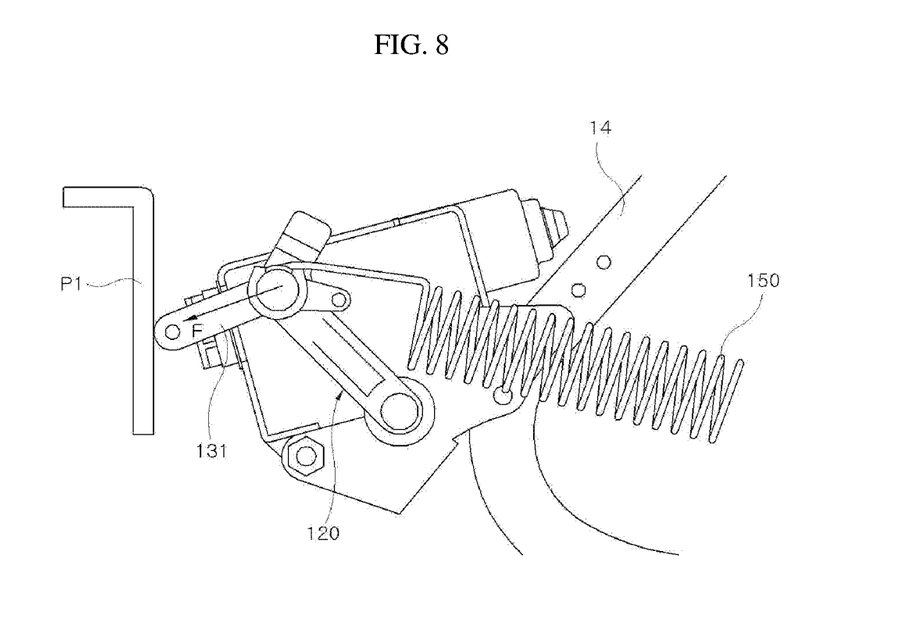

Now, the opening reaction force part 131 of the rotated opening trigger link 130 is in contact with a front side panel P1 mounted on the vehicle body, and as illustrated in FIG. 8, pushes the front side panel P1 to generate a reaction force F, such that the state of Mt<Ms+F occurs, thereby increasing the opening robustness.

Figure 9:
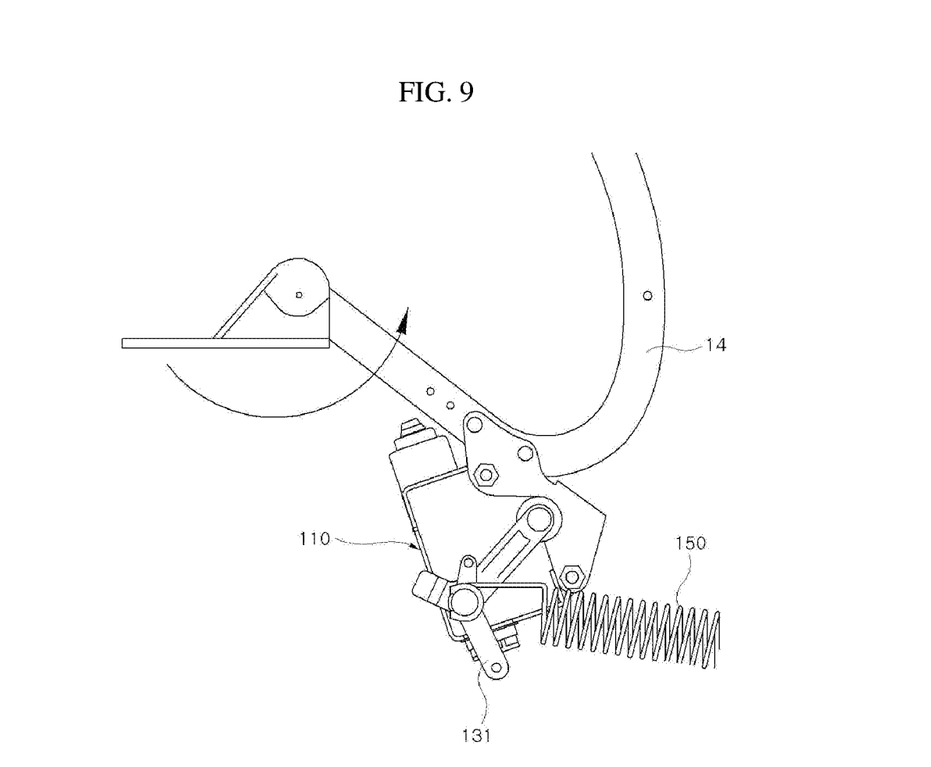
Figure 10:
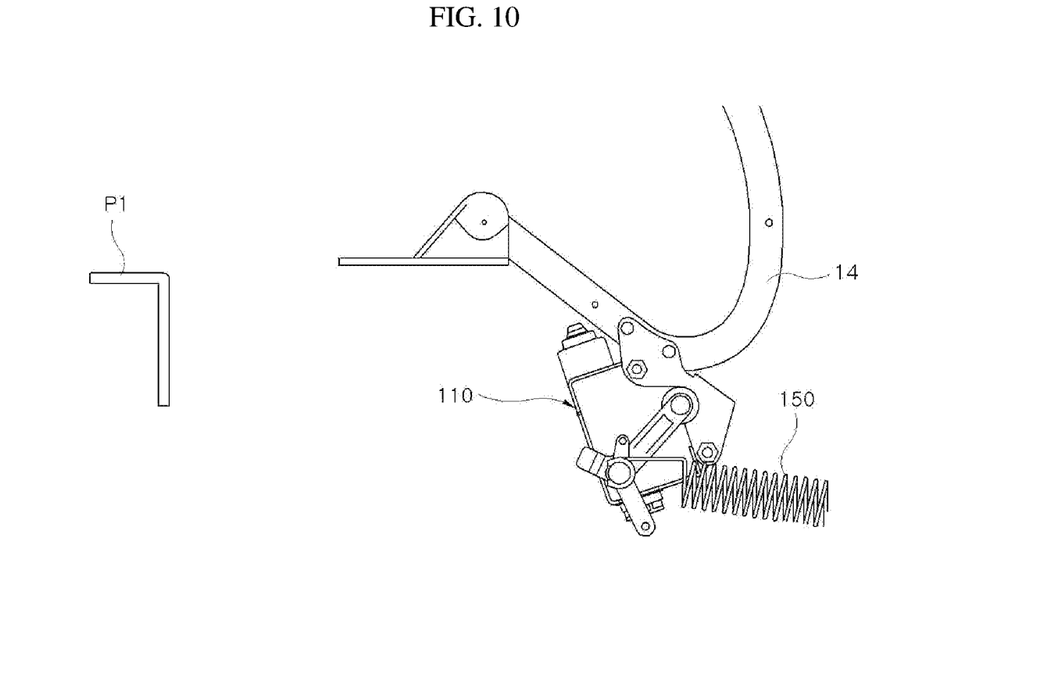

Then, as illustrated in FIG. 9, the actuator 110, the closing trigger link 120, and the opening trigger link 130 are completely rotated, such that the hinge arm 14 is rotated, such that the trunk lid changes to a state of being completely opened. At this time, the trunk lid is operated by the restoring force of the link spring 160 to the original state illustrated in FIG. 9 more smoothly.

Figure 11:
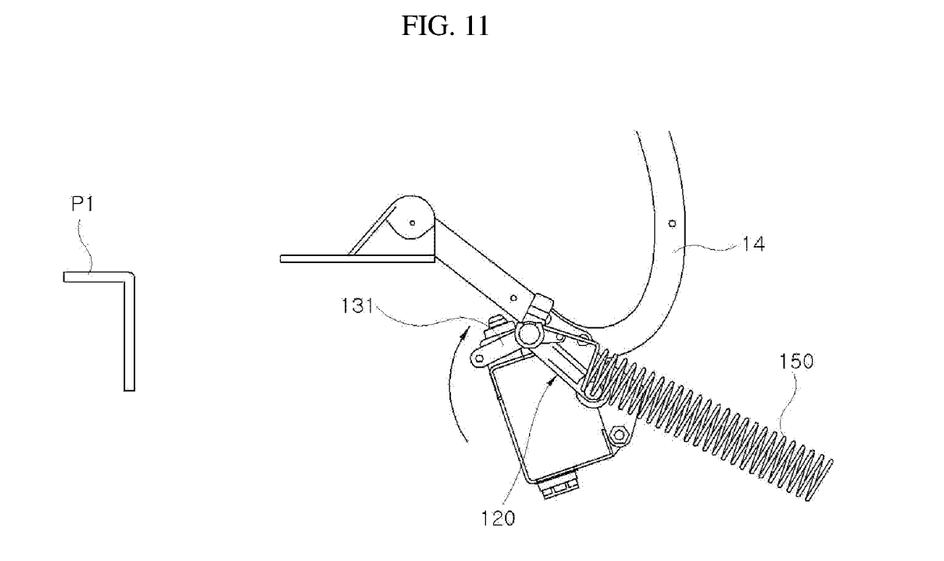

As described above, in the opened state illustrated in FIG. 10, it becomes the state of Mt<Ms by the compressed spring 150, and the actuator is operated by the closing instruction, such that when the motor rotary shaft 115 is rotated clockwise, as illustrated in FIG. 11, the closing trigger link 120 coupled to the motor rotary shaft 115 is rotated clockwise, and the opening trigger link 130 coupled to the closing trigger link 120 is rotated together. At this time, it becomes the state of Mt>Ms.

Figure 12:
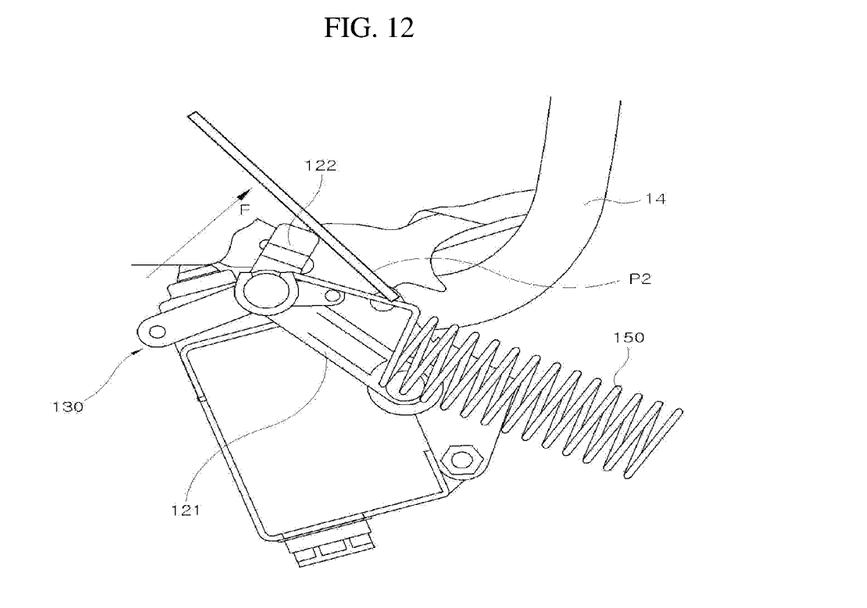

Now, the closing reaction force part 122 of the rotated closing trigger link 120 is in contact with a rear side panel P2 mounted on the vehicle body, and as illustrated in FIG. 12, pushes the rear side panel P2 to generate the reaction force F, such that the state of Mt>Ms−F occurs, thereby increasing the closing robustness.

Figure 13:
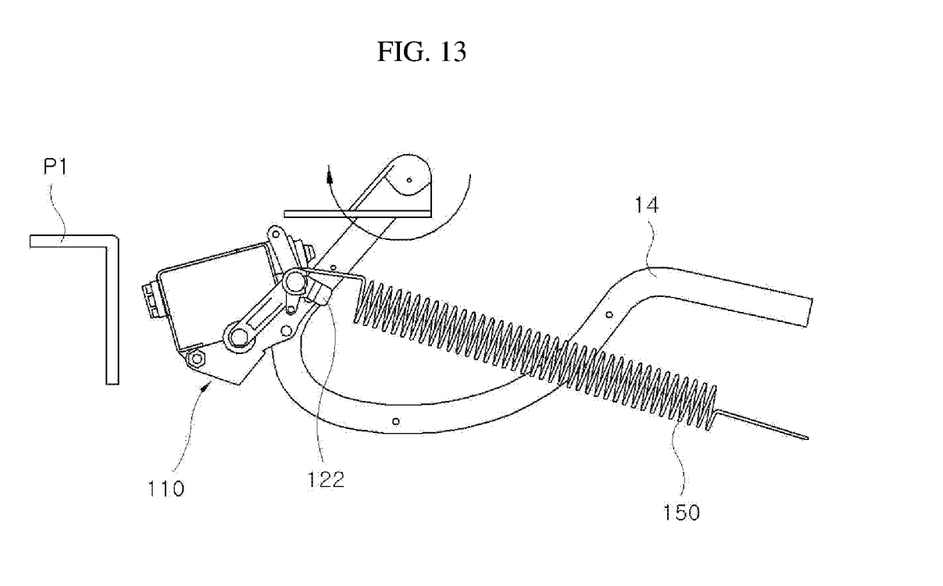

Then, as illustrated in FIG. 13, the actuator 110, the closing trigger link 120, and the opening trigger link 130 are completely rotated clockwise, such that the hinge arm 14 is rotated, such that the trunk lid becomes a state of being completely closed by its own weight.

Meanwhile, when the trunk lid is manually closed by the third party's use or the customer's intention, the opening trigger link is in contact with the panel when the trunk lid is closed about 95%, and when the trunk lid is completely closed, the opening trigger link is rotated counterclockwise along the axis mounted on the closing trigger link and then as illustrated in FIG. 7, returns to the original location by the link spring 160 while the actuator returns to a location for performing the opening.

As described above, the apparatus for automatically opening and closing the trunk lid according to embodiments of the present disclosure may apply the compact actuator to smoothly and automatically open and close the trunk lid.

As described above, the present disclosure has been described with reference to the exemplary drawings, but is not limited to the described exemplary embodiments, and it is apparent to those skilled in the art that the present disclosure may be variously modified and changed without departing from the spirit and scope of the present disclosure. For example, the fixed component expressed as the vehicle body in the specification may be a component fixed to the vehicle body such as the vehicle body, the panel separately mounted on the vehicle body, or the bracket. Therefore, these modified examples or changed examples fall within the claims of the present disclosure, and the scope of the present disclosure should be construed based on the appended claims.

What is claimed is:

1. An apparatus for automatically opening and closing a trunk lid, the apparatus comprising:
   an actuator configured to be coupled to a hinge arm coupled to the trunk lid;
   a closing trigger link having a first end rotatably coupled to the actuator, wherein the closing trigger link comprises a rotating part having a first end coupled to the actuator and a closing reaction force part formed to extend from a second end of the rotating part;
   an opening trigger link rotatably coupled to the closing trigger link;
   a spring assembling pin having a first end coupled to the closing trigger link and the opening trigger link; and
   a spring having a first end coupled to a second end of the spring assembling pin and a second end configured to be coupled to a vehicle body or a panel to be mounted on the vehicle body.

2. The apparatus of claim 1, wherein the opening trigger link comprises:
   an opening reaction force part having a first end coupled to the second end of the rotating part; and
   a constraining part formed to extend from the first end of the opening reaction force part.

3. The apparatus of claim 2, wherein the first end of the spring assembling pin is coupled to the second end of the rotating part and the first end of the opening reaction force part.

4. The apparatus of claim 2, further comprising:
a first protrusion pin fastened to the first end of the rotating part and a second protrusion pin fastened to an edge end of the constraining part; and
a link spring having a first end coupled to the first protrusion pin and a second end coupled to the second protrusion pin.

5. The apparatus of claim 4, wherein when the closing trigger link is rotated counterclockwise, the opening reaction force part is configured to apply a pushing force to the vehicle body or the panel mounted on the vehicle body.

6. The apparatus of claim 4, wherein when the closing trigger link is rotated clockwise, the closing reaction force part is configured to apply a pushing force to the vehicle body or the panel configured to be mounted on the vehicle body.

7. The apparatus of claim 4, wherein the second protrusion pin coupled to the constraining part is fastened to penetrate the edge end of the constraining part, and has a first end coupled to the link spring and a second end in contact with the closing trigger link upon a rotating operation of the constraining part.

8. The apparatus of claim 2, wherein when the closing trigger link is rotated counterclockwise, the opening reaction force part is configured to apply a pushing force to the vehicle body or the panel mounted on the vehicle body.

9. The apparatus of claim 2, wherein when the closing trigger link is rotated clockwise, the closing reaction force part is configured to apply a pushing force to the vehicle body or the panel configured to be mounted on the vehicle body.

10. An apparatus for automatically opening and closing a trunk lid, the apparatus comprising:
an actuator configured to be coupled to a hinge arm coupled to the trunk lid;
a closing trigger link comprising a rotating part having a first end rotatably coupled to the actuator and a closing reaction force part formed to extend from a second end of the rotating part; and
an opening trigger link comprising an opening reaction force part having a first end rotatably coupled to the second end of the rotating part and a constraining part formed to extend from the first end of the opening reaction force part.

11. The apparatus of claim 10, wherein when the closing trigger link is rotated counterclockwise, the opening reaction force part is configured to apply a pushing force to a vehicle body or a panel configured to be mounted on the vehicle body.

12. The apparatus of claim 11, wherein when the closing trigger link is rotated clockwise, the closing reaction force part is configured to apply the pushing force to the vehicle body or the panel configured to be mounted on the vehicle body.

13. The apparatus of claim 12, further comprising:
a first protrusion pin fastened to the first end of the rotating part and a second protrusion pin fastened to an edge end of the constraining part; and
a link spring having a first end coupled to the first protrusion pin and a second end coupled to the second protrusion pin.

14. The apparatus of claim 13, wherein the second protrusion pin coupled to the constraining part is fastened to penetrate the edge end of the constraining part, and has a first end coupled to the link spring and a second end in contact with the rotating part upon a rotating operation of the constraining part.

15. A vehicle comprising:
a vehicle body;
a trunk lid coupled to the vehicle body;
a hinge arm coupled to the trunk lid;
an actuator coupled to the hinge arm;
a closing trigger link comprising a rotating part having a first end coupled to the actuator and a closing reaction force part formed to extend from a second end of the rotating part;
an opening trigger link rotatably coupled to the closing trigger link, the opening trigger link comprising an opening reaction force part having a first end coupled to the second end of the rotating part and a constraining part formed to extend from the first end of the opening reaction force part;
a spring assembling pin having a first end coupled to the closing trigger link and the opening trigger link; and
a spring having a first end coupled to a second end of the spring assembling pin, and a second end coupled to the vehicle body or a panel mounted on the vehicle body.

16. The vehicle of claim 15, wherein the first end of the spring assembling pin is coupled to the second end of the rotating part and the first end of the opening reaction force part.

17. The vehicle of claim 15, further comprising:
a first protrusion pin fastened to the first end of the rotating part and a second protrusion pin fastened to an edge end of the constraining part; and
a link spring having a first end coupled to the first protrusion pin and a second end coupled to the second protrusion pin.

18. The vehicle of claim 17, wherein the second protrusion pin coupled to the constraining part is fastened to penetrate the edge end of the constraining part, and has a first end coupled to the link spring and a second end in contact with the closing trigger link upon a rotating operation of the constraining part.

19. The vehicle of claim 15, wherein when the closing trigger link is rotated counterclockwise, the opening reaction force part is configured to apply a pushing force to the vehicle body or the panel mounted on the vehicle body.

20. The vehicle of claim 15, wherein when the closing trigger link is rotated clockwise, the closing reaction force part is configured to apply a pushing force to the vehicle body or the panel configured to be mounted on the vehicle body.

* * * * *